(12) United States Patent
Lee et al.

(10) Patent No.: US 8,085,656 B2
(45) Date of Patent: Dec. 27, 2011

(54) APPARATUS AND METHOD FOR IMPROVING TRANSPORT CONTROL PROTOCOL PERFORMANCE USING PATH RECOVERY NOTIFICATION OVER WIRELESS NETWORK

(75) Inventors: Myung-Jin Lee, Seoul (KR); Jongik Kim, Daejeon (KR); Daesub Yoon, Daejeon (KR); Ju-Wan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 118 days.

(21) Appl. No.: 12/517,749

(22) PCT Filed: Aug. 6, 2007

(86) PCT No.: PCT/KR2007/003769
§ 371 (c)(1),
(2), (4) Date: Jun. 4, 2009

(87) PCT Pub. No.: WO2008/069398
PCT Pub. Date: Jun. 12, 2008

(65) Prior Publication Data
US 2010/0014419 A1   Jan. 21, 2010

(30) Foreign Application Priority Data
Dec. 8, 2006   (KR) .................. 10-2006-0125030

(51) Int. Cl.
H04L 12/26   (2006.01)
(52) U.S. Cl. .................. 370/225; 370/331; 455/436
(58) Field of Classification Search .......... 370/216–229, 370/236, 395.52, 331; 455/436
See application file for complete search history.

(56) References Cited

U.S. PATENT DOCUMENTS

| 5,912,878 | A | * | 6/1999 | Park et al. ..................... 370/229 |
| 6,546,425 | B1 | * | 4/2003 | Hanson et al. ................ 709/227 |
| 6,874,106 | B2 | * | 3/2005 | Suzuyama et al. ............. 714/57 |
| 6,876,639 | B1 | * | 4/2005 | Cao .............................. 370/331 |
| 7,187,666 | B1 | * | 3/2007 | Farley et al. .................. 370/331 |
| 7,302,479 | B2 | * | 11/2007 | Stevens et al. ................ 709/224 |
| 2003/0117992 | A1 | | 6/2003 | Kim et al. |
| 2005/0185664 | A1 | | 8/2005 | Chaskar et al. |
| 2006/0009213 | A1 | * | 1/2006 | Sturniolo et al. .......... 455/426.1 |
| 2006/0133379 | A1 | * | 6/2006 | Krishnan et al. ............. 370/394 |
| 2006/0240830 | A1 | * | 10/2006 | Ranta-aho et al. ............ 455/436 |

FOREIGN PATENT DOCUMENTS

| KR | 10-2004-0067343 | 7/2004 |
| KR | 10-2005-0059799 | 6/2005 |
| KR | 10-2006-0119095 | 11/2006 |

OTHER PUBLICATIONS

International Search Report for PCT/KR2007/003769, mailed Nov. 13, 2007.

* cited by examiner

Primary Examiner — Gary Mui
(74) Attorney, Agent, or Firm — Staas & Halsey LLP

(57) ABSTRACT

Provided are an apparatus and method for improving transmission control protocol (TCP) performance using path recovery notification over a wireless network. The apparatus includes: a path recovery manager which detects a mobile host recovered from a temporary disconnection state and then outputs a detection signal to notify the detection result; a path recovery notification manager which receives the detection signal and generates an ACK (acknowledgement) packet to inform a transmitting end that the mobile host is recovered; and a first packet transceiver which transmits/receives the generated ACK packet and a data packet. Accordingly, a temporary disconnection state of a wireless network is explicitly informed to a transmitting end so as to transmit only lost packets without performing unnecessary congestion control, thereby improving TCP performance.

9 Claims, 4 Drawing Sheets

APPARATUS AND METHOD FOR IMPROVING TRANSPORT CONTROL PROTOCOL PERFORMANCE USING PATH RECOVERY NOTIFICATION OVER WIRELESS NETWORK

CROSS-REFERENCE TO RELATED PATENT APPLICATION

This application claims the benefit under 35 U.S.C. Section 371, of PCT International Application Number PCT/KR2007/03769, filed Aug. 6, 2007 and Korean Patent Application No. 10-2006-0125030, filed on Dec. 8, 2006, in the Korean Intellectual Property Office, the disclosures of which are incorporated herein in their entirety by reference.

BACKGROUND OF THE INVENTION

1. Field of the Invention

The present invention relates to an apparatus and method for improving transport control protocol (TCP) performance using path recovery notification over a wireless network, and more particularly, to an apparatus and method for path recovery notification which explicitly notifies recovery of a temporary disconnected wireless network in order to solve a problem in which TCP performance decreases due to a reduced data transfer rate when a congestion control algorithm is performed at a transmitting end because network congestion is misunderstood as a cause of packet loss while the packet loss is actually caused by a high probability of bit error or a handoff.

2. Description of the Related Art

In an attempt to overcome a problem in poor transport control protocol (TCP) performance caused by packet loss, not caused by network congestion, several techniques have been proposed such as U.S. Patent Application No. 2005-0185664 by Hemant Chaskar et al., U.S. Patent Application No. 2003-0117992 by Yun Joo Kim et. al, and Korean Patent Application No. 2004-0067343 by Chang Hwan Park.

First, U.S. Patent Application No. 2005-0185664 discloses a split TCP connection method in which TCP sections are divided into a wireless TCP section and a wired TCP section. Packet loss of the wireless TCP section is handled according to a wireless TCP of the wireless TCP section, so that poor performance can be prevented when the wired TCP section misrecognizes that the packet loss is caused by network congestion. However, the method has a disadvantage in that a new TCP session has to be connected when a mobile host performs a handoff to change a base station. Furthermore, in order to prevent this disadvantage, scalability of a network structure cannot be achieved.

In addition, U.S. Patent Application No. 2003-0117992 discloses a method in which a snoop agent of a base station analyzes a TCP packet without having to alter an end-to-end TCP and handles packet loss produced over a wireless network by using local retransmission. However, when a mobile host performs a handoff, a first snoop agent inconveniently has to pass a TCP data packet and state information stored in a buffer to a second snoop agent of a base station to which the mobile host belongs after the handoff is performed. Therefore, the method has a disadvantage in that, in this process, retransmission timeout (RTP) occurs in a TCP section of a transmitting end, which may lead to poor TCP performance.

In addition, Korean Patent Application No. 2004-0067343 discloses a method in which a snoop protocol is expanded so that the state of a wireless link is divided into a normal state, a bad state, and a handoff state. If the wireless link is in the normal state, performance is maximized by setting a maximum buffer size used in a snoop module to a congestion window size. In this case, in order to avoid network congestion, a congestion window of a transmitting end has to transmit data by selecting a smaller value between a receiver's window size and the congestion window size. However, when the congestion window is arbitrarily increased to be large in size, network congestion may occur in the wired network. On the other hand, if the wireless link is in the bad state, the snoop module transmits an acknowledgement (ACK) packet, in which the receiver's window size is set to 0, to a TCP section of the transmitting end when the RTO occurs two times, thereby preventing a transmitter's TCP section from transmitting a data packet. However, even in this case, reliable TCP performance is not guaranteed since the RTO of the transmitter's TCP section cannot be completely avoided. Finally, if the wireless link is in the handoff state, the snoop module avoids data loss caused by a handoff while passing its own data packet and state information to the snoop module of the base station to which a mobile host is moved. In this case, the snoop module of the base station has to handle packet forwarding. In general, the snoop module of the base station has to independently manage buffers for respective TCP connections. As a result, overhead occurs in the operation of the base station.

Meanwhile, in order to solve a problem of temporary disconnection caused by the handoff of the wireless link or a transmission interruption of the base station, a freeze-TCP has been proposed in academic circles. In the freeze-TCP, a TCP section of a receiving end predicts disconnection of the wireless link and sends a zero window advertisement to a TCP section of a transmitting end in advance. Therefore, a persist mode is continued while packet transmission is prevented, thereby avoiding packet loss in the wireless link. When the link is recovered, the TCP section of the receiving end informs a normal window size, so that the persist mode is released and thus the TCP section of the transmitting end can transmit a data packet without performance degradation. However, in practice, reliable performance is not expected when this method is used, since the performance can be guaranteed when disconnection time of the wireless link is accurately predicted.

SUMMARY OF THE INVENTION

The present invention provides an apparatus and method for improving transport control protocol (TCP) performance by explicitly notifying recovery of a network path to a transmitting end so as to transmit only lost packets without performing unnecessary congestion control in order to solve a problem of operating a TCP congestion control algorithm because network congestion is misunderstood as a cause of packet loss while the packet loss is actually caused by temporary disconnection of the wireless network.

According to an aspect of the present invention, there is provided an apparatus for improving TCP performance using path recovery notification over a wireless network, the apparatus comprising: a path recovery manager which detects a mobile host recovered from a temporary disconnection state and then outputs a detection signal to notify the detection result; a path recovery notification manager which receives the detection signal and generates an ACK (acknowledgement) packet to inform a transmitting end that the mobile host is recovered; and a first packet transceiver which transmits/receives the generated ACK packet and a data packet.

According to another aspect of the present invention, there is provided a method of improving TCP performance using path recovery notification over a wireless network, the method comprising: recognizing recovery of a wireless section without disconnection; encapsulating information on recovery into an ACK packet and transmitting the information to a receiving end; setting a timer to RTT (round trip time)/2; canceling the operation of the timer and transmitting the ACK packet, in which a partial packet loss flag is set and a SACK (selective acknowledgement) option field is added, to a transmitting end if a data packet is received before the timer is expired; and setting a no-packet-arrival flag in the ACK packet and then transmitting the ACK packet to the transmitting end if the timer is expired.

According to another aspect of the present invention, there is provided a method of improving TCP performance using path recovery notification over a wireless network, the method comprising: checking whether a newly received ACK packet is recovered from packet loss if a loss recovery flag is set which indicates whether loss recovery is being processed; releasing the loss recovery flag if the checking result shows that the packet loss is recovered, determining whether a congestion window is sufficiently sized to transmit a new packet if a non-recovered duplicate ACK packet is received, and transmitting the new packet to a receiving end if the determination result shows that the new packet can be transmitted; checking whether a path recovery option number is contained in the received ACK packet if the loss recovery flag is not set, and checking whether a retransmission timer is expired if the path recovery option number is contained in the received ACK packet; restoring the congestion window and a slow start threshold to a value used before the retransmission timer is expired if the retransmission timer is expired, and checking whether the partial packet loss flag is set if the retransmission timer is not expired; setting the loss recovery flag and transmitting only lost packets by analyzing the SACK blocks and then extracting lost packet numbers if the partial packet loss flag is set, and comparing whether a difference between a last packet transmission time and a current time is equal to or greater than the RTT if the partial packet loss flag is not set; and setting the loss recovery flag and retransmitting all packets transmitted after a last ACK packet is received if the comparison result shows that the difference is equal to or greater than the RTT, and performing a slow start algorithm in the case that the no-packet-arrival flag is set in the path recovery option field if the comparison result shows that the difference is less than the RTT.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
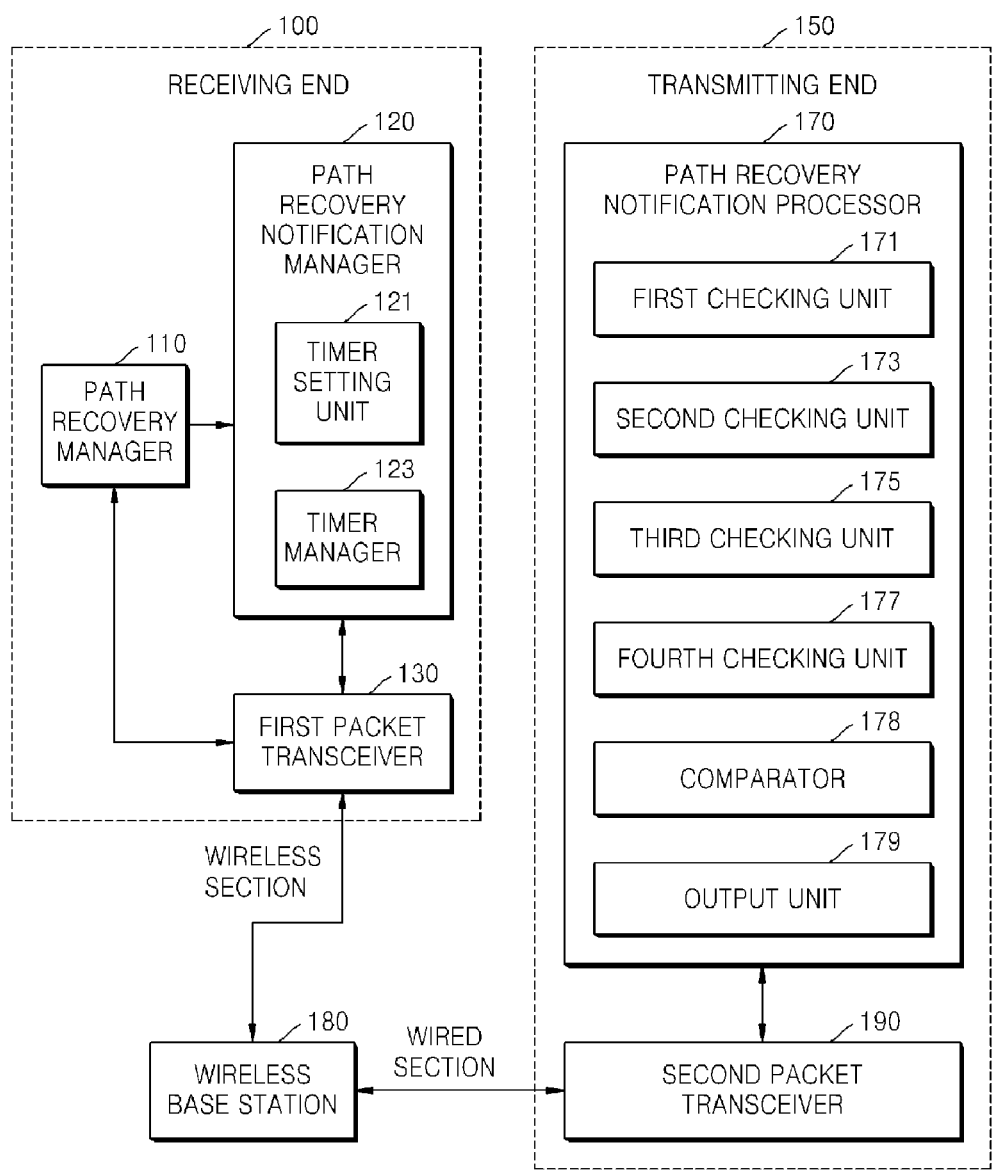
FIG. 1 is a block diagram illustrating a structure of an apparatus for improving transmission control protocol (TCP) performance by using path recovery notification over a wireless network according to an embodiment of the present invention.
Figure 2:
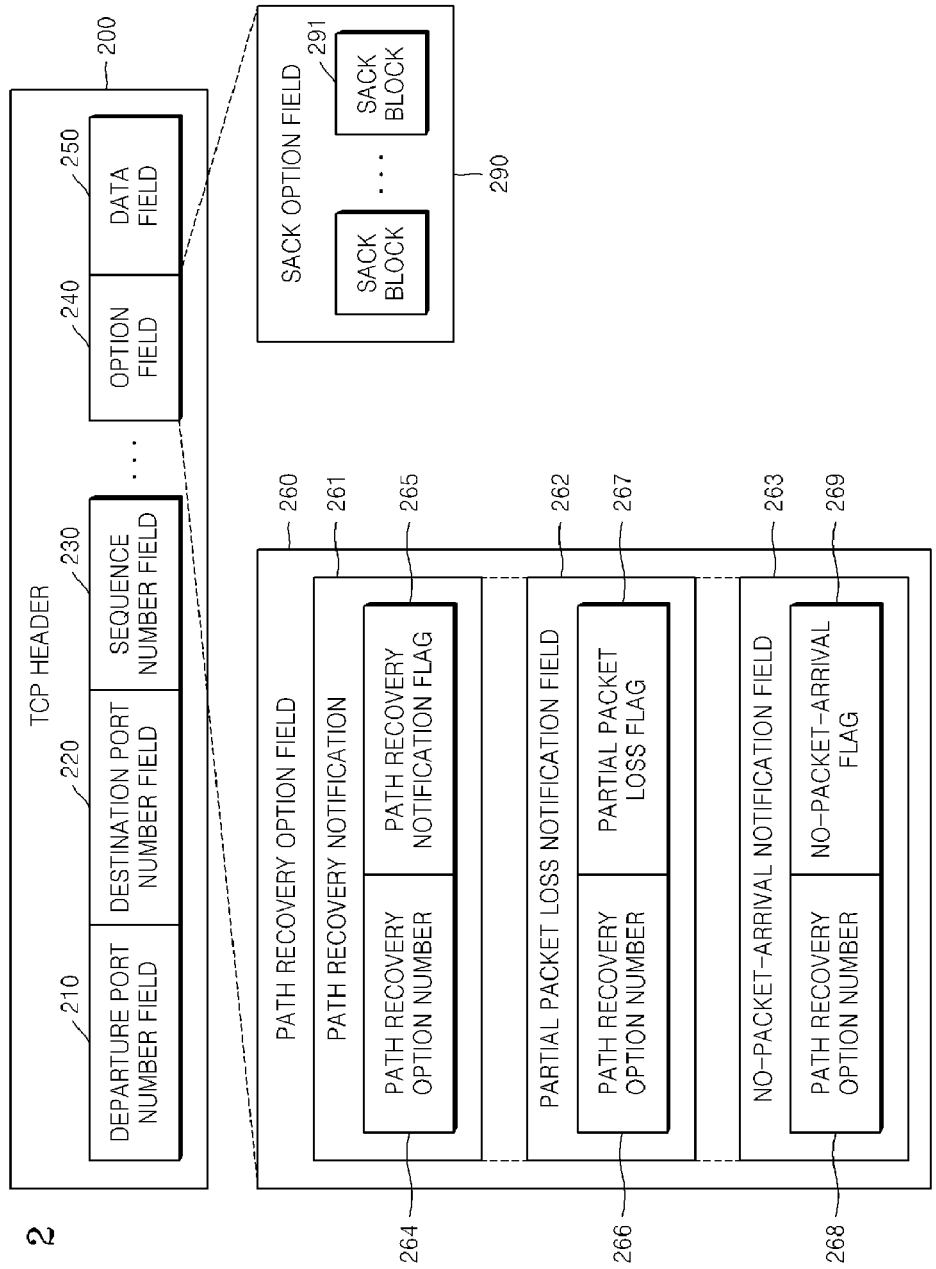
FIG. 2 illustrates a structure of a TCP message header used in an apparatus and method for improving TCP performance by using path recovery notification over a wireless network according to an embodiment of the present invention.
Figure 3:
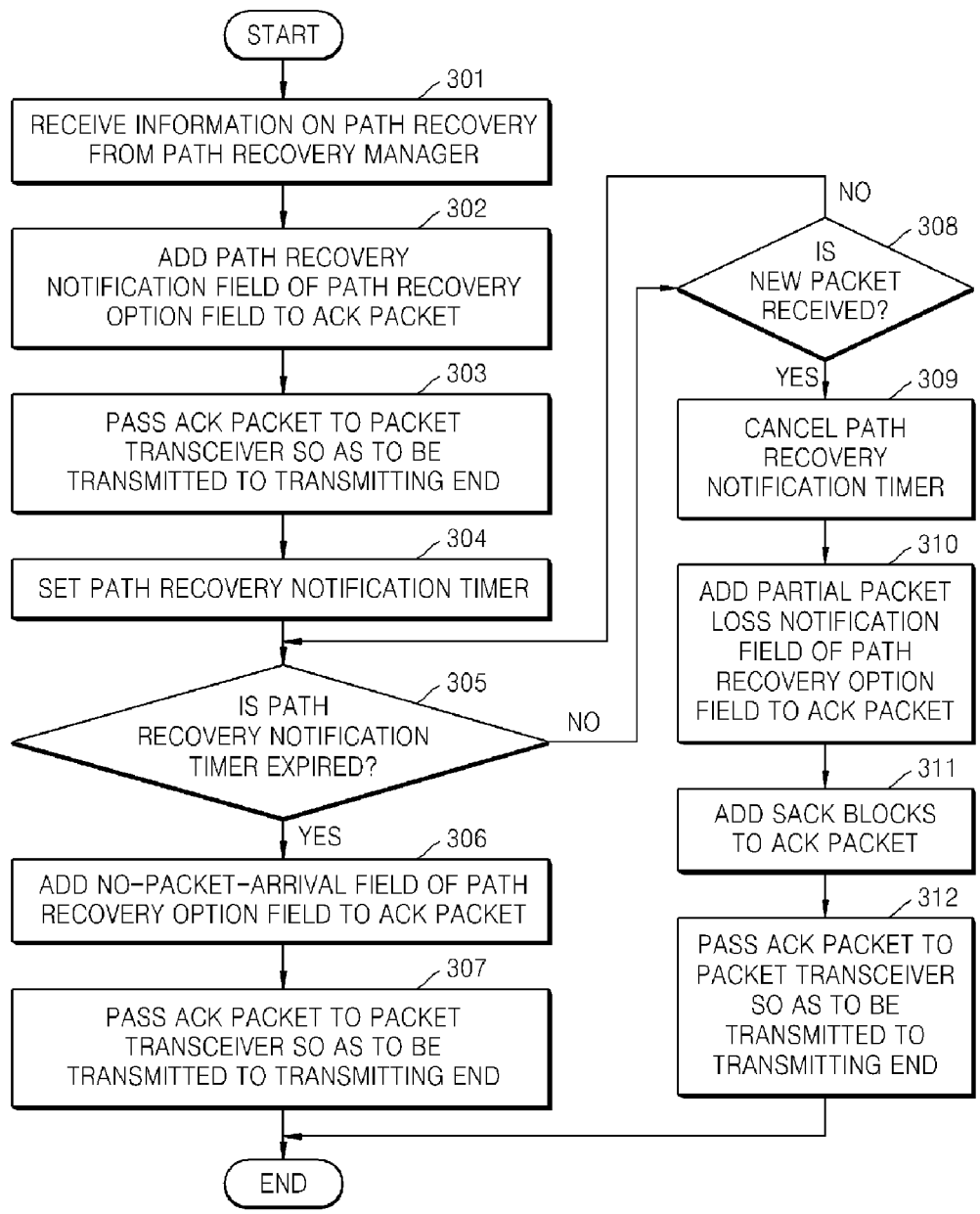
FIG. 3 is a flowchart illustrating a process in which a receiving end informs a transmitting end that a path of a wireless network is recovered in a method of improving TCP performance by using path recovery notification over a wireless network according to an embodiment of the present invention.
Figure 4:
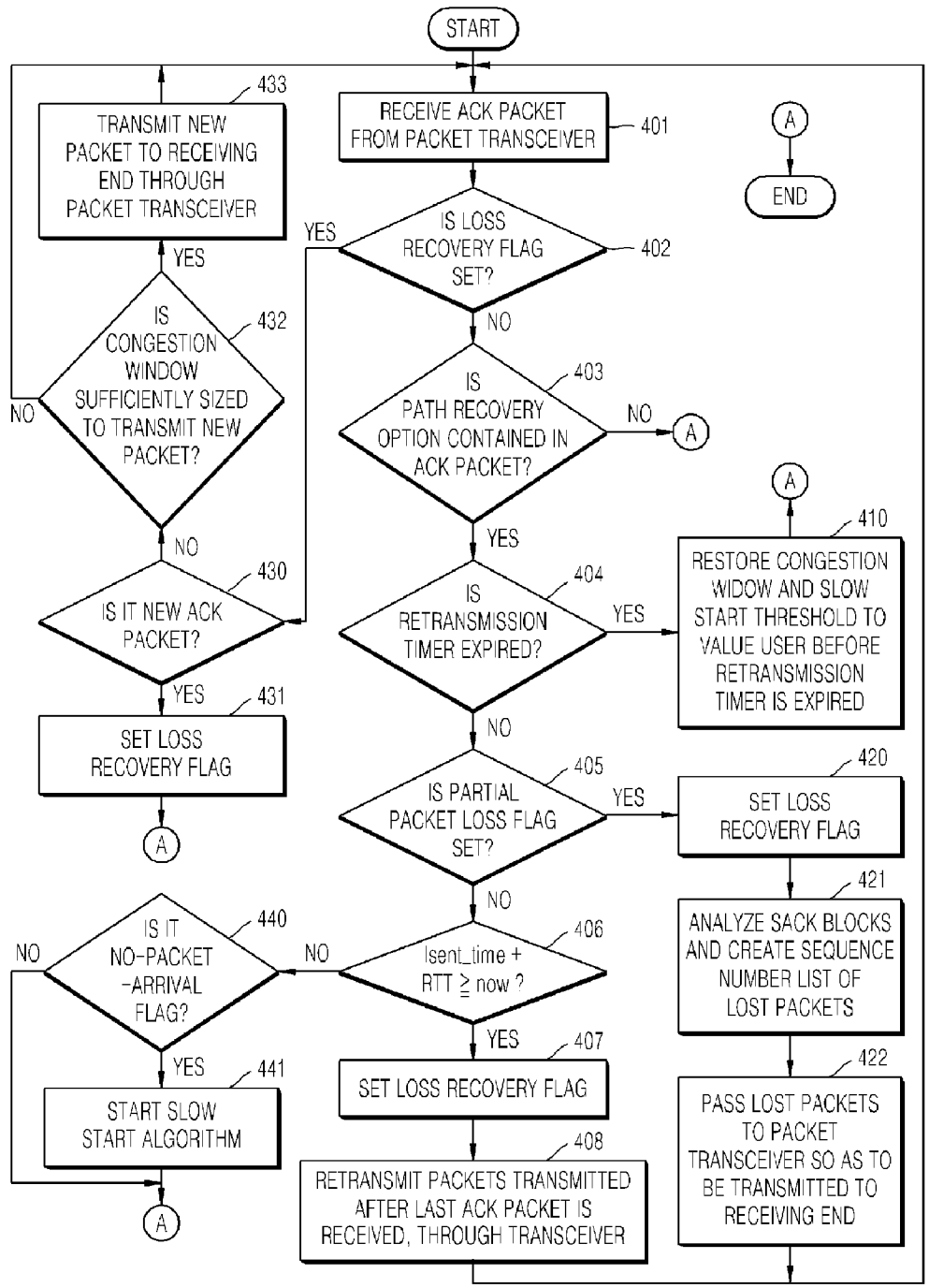
FIG. 4 is a flowchart illustrating a process performed when a TCP packet is received in a transmitting end in a method of improving TCP performance by using path recovery notification over a wireless network according to an embodiment of the present invention.

Hereinafter, exemplary embodiments of the present invention will be described with reference to the accompanying drawings. Like reference numerals denote like elements throughout the drawings. For clarity, descriptions of some constructions and elements not directly related to the present will be omitted. FIG. 1 is a block diagram illustrating a structure of an apparatus for improving transmission control protocol (TCP) performance by using path recovery notification over a wireless network according to an embodiment of the present invention. FIG. 2 illustrates a structure of a TCP message header used in an apparatus and method for improving TCP performance by using path recovery notification over a wireless network according to an embodiment of the present invention. FIG. 3 is a flowchart illustrating a process in which a receiving end informs a transmitting end that a path of a wireless network is recovered in a method of improving TCP performance by using path recovery notification over a wireless network according to an embodiment of the present invention. FIG. 4 is a flowchart illustrating a process performed when a TCP packet is received in a transmitting end in a method of improving TCP performance by using path recovery notification over a wireless network according to an embodiment of the present invention. To facilitate description and understanding, the apparatus and the method will be described together.

Referring first to FIG. 1, an overall system of the present invention includes a receiving end 100, a transmitting end 150, and a wireless base station 180 which connects the receiving end 100 and the transmitting end 150. The receiving end 100 includes a path recovery manager 110, a path recovery notification manager 120, and a first packet transceiver 130. The path recovery notification manager 120 includes a timer setting unit 121 and a timer manager 123. The path recovery manager 110 detects a mobile host that is recovered from a temporary disconnection state and then outputs a detection signal to inform the recovery. The path recovery notification manager 120 receives the detection signal and generates an acknowledge (ACK) packet for informing the recovery state to the transmitting end 150. The first packet transceiver 130 transmits/receives the generated ACK packet and a data packet through the wireless base station 180. In this case, the receiving end 100 may be a mobile station, and the transmitting end 150 may be an apparatus that is wire-connected to the wireless base station 180 performing a packet communication with the receiving end 100.

The transmitting end 150 includes a second packet transceiver 190 which transmits/receives the data packet and the ACK packet through the first packet transceiver 130 and the wireless base station 180. And The transmitting end 150 includes a path recovery notification processor 170 which handles a process when a path recovery option field is contained in the received ACK packet. The path recovery notification processor 170 includes first to fourth checking units 171, 173, 175, and 177, a comparator 178, and an output unit 179. These elements will be described later with reference to FIGS. 3 to 4.

In brief, according to information transmitted from the first packet transceiver 130 to the path recovery manager 110, the receiving end 100 informs the path recovery notification manager 120 that a path is recovered in a wireless section. Thereafter, the path recovery notification manager 120 generates an ACK packet containing the path recovery option field and transmits the ACK packet to the transmitting end 150 through the first packet transceiver 130.

Thereafter, the transmitting end 150 checks the ACK packet which the second packet transceiver 190 received. If the checking result shows that the path recovery option field is contained in the ACK packet, a corresponding process is handled by the path recovery notification processor 170.

Referring to FIG. 2, a TCP header structure will be described which contains the path recovery option field. In this structure, fields basically contained in the TCP header belong to the prior art. Thus, only some parts of the fields will be described, and the following description will focus on the path recovery option field and a selective acknowledgement (SACK) option field.

A TCP header 200 basically includes a departure port number field 210, a destination port number field 220, and a sequence number field 230. Optionally, the TCP header 200 includes an option field 240 and a data field 250. The option field 240 includes a path recovery option field 260 and a SACK option field 290. The path recovery option field 260 may include three types of operations, that is, a path recovery notification 261, a partial packet loss notification 262, and a no-packet-arrival notification 263. One of these operations 261, 262, and 263 is selected to be contained in the TCP header 200. The SACK option field 290 is composed of one or more SACK blocks 291. The SACK option field 290 is contained in the TCP header 200 along with the partial packet loss notification field 262 of the path recovery option field 260. Usages of the path recovery option field 260 and the SACK option field 290 will be described later when the operation of the present invention is described.

Referring to FIG. 3, a flow of a process will be described in which a receiving end informs path recovery notification to a transmitting end. First, the path recovery notification manager 120 of the receiving end 100 receives information on path recovery from the path recovery manager 110 in operation 301. The path recovery notification field 261 of the path recovery option field 260 is added to the ACK packet, and a path recovery option number 264 and a path recovery notification flag 265 are set. In this case, the path recovery option number 264 indicates that the path recovery option field 260 is contained in the TCP header 200. This number is arbitrarily set by an operator. Any number can be assigned except for numbers used in the convention TCP. Therefore, the path recovery option numbers 264, 266, and 268 have the same number. The ACK packet is passed to the first packet transceiver 130 so as to be transmitted to the transmitting end 150 in operations 302 and 303. The timer setting unit 121 sets a path recovery notification timer to a round trip time (RTT)/2 in preparation for the case that the transmitted ACK packet is not processed in the transmitting end 150 in operation 304. If the path recovery notification timer is expired, the timer manager 123 sets the no-packet-arrival notification field 263 of the path recovery option field 206 in the ACK packet. That is, the path recovery option number field 268 and a no-packet-arrival flag 269 are set. The result is transmitted to the transmitting end 150 through the first packet transceiver 130, thereby completing the procedure in operations 305 to 307. However, if the path recovery notification timer is not expired, it is checked whether a new packet is received in operation 308. If the new packet is not received, the procedure waits until the timer is expired. If the new packet is received, the path recovery notification timer is canceled, and the partial packet loss notification field 262 of the path recovery option field 260 is added as an option of the ACK packet. That is, the path recovery option number 266 and the path recovery notification flag 267 are set, and a sequence number of the received new packet is then checked to create the SACK blocks 291. The SACK option field 290 is then added to the ACK packet in operations 309 to 311. The ACK packet is passed to the first packet transceiver 130 so as to be transmitted to the transmitting end 150, thereby completing the procedure in operation 312.

Referring to FIG. 4, a flow of a process will be described which is performed when the transmitting end 150 receives an ACK packet containing the path recovery option field 260. When the ACK packet is received from the second packet transceiver 190, the first checking unit 171 checks whether a loss recovery flag showing that loss recovery is being performed by the conventional wireless link is set in the transmitting end 150 in operations 401 and 402. If the loss recovery flag is set, it is checked whether the received ACK packet is a new ACK packet in operation 430. The output unit 179 receives the determination result. If the determination result shows that the new ACK packet is received, the loss recovery flag is set, and the procedure is terminated in operation 431. Otherwise, it is checked whether a congestion window is sufficiently sized to transmit the new packet in operation 432. The congestion window is a variable for restricting a maximum number of packets simultaneously transmitted over a TCP network. Network congestion can be avoided by using the congestion window. If the congestion window is sufficiently sized to transmit the new packet, the packet is transmitted to the receiving end 100 through the second packet transceiver 190. The procedure waits for receiving the ACK packet in operations 433 and 401.

If the loss recovery flag is not set, the second checking unit 173 checks whether the path recovery option field 260 is contained as an option of the ACK packet in operation 403. If the path recovery option field 260 is not contained, the procedure is terminated. Otherwise, it is checked whether a retransmission timer is expired inoperation 404.

The third checking unit 175 receives the determination result. If the determination result shows that the retransmission timer is expired, the congestion window and a slow start threshold are restored to have a value used before the retransmission timer is expired, thereby completing the procedure in operation 410 (herein, when the congestion window has the same value as a slow start threshold, a slow start algorithm to be described later is ended to start a congestion avoid algorithm. The slow star threshold is a reference value for ending the slow start algorithm.). If the retransmission timer is not expired, it is checked whether the partial packet loss flag 267 is set in the path recovery option field 260 in operation 405.

If the determination result shows that the partial packet loss flag 267 is set, the comparator 178 analyzes the SACK blocks 291, sets the loss recovery flag, and generates a sequence number list of lost packets. Only lost packet(s) are passed to the second packet transceiver 190 so as to be transmitted to the receiving end 100. The procedure waits for receiving the ACK packet in operations 420 to 422, and 401. In the case that the partial packet loss flag 267 is not set, it is checked whether a difference between a last packet transmission time (lsent_time) and a current time is equal to or greater than an RTT (operation 406). If the difference between last packet transmission time (lsent_time) and the current time is equal to or greater than the RTT, the fourth checking unit 177 sets the loss recovery flag, retransmits all packets transmitted after a last ACK packet is received, and waits for receiving the ACK packet in operations 407, 408, and 401. If the difference is less than the time period of RTT, it is checked whether the nopacket-arrival flag 269 is contained in the path recovery option field 260 in operation 440. If the no-packet-arrival flag 269 is set, the slow start algorithm starts, thereby completing the procedure in operation 441. According to TCP, a new packet is transmitted when ACK packets are sequentially received. The slow start algorithm exponentially increases the number of new transmission packets with respect to the sequentially received ACK packets. If the no-packet-arrival flag 269 is not set, the procedure is complete.

According to an apparatus and method for improving transmission control protocol (TCP) performance using path recovery notification over a wireless network, a temporary disconnection state of a wireless network is explicitly informed to a transmitting end so as to transmit only lost packets without performing unnecessary congestion control, thereby improving TCP performance.

In addition, since only transmitting and a receiving ends are altered, a network structure and intermediate nodes such as a router do not have to be changed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for improving transmission control protocol (TCP) performance using path recovery notification over a wireless network, the apparatus comprising:
   a path recovery manager which detects a mobile host recovered from a temporary disconnection state and then outputs a detection signal to notify the detection result;
   a path recovery notification manager which receives the detection signal and generates an acknowledgement (ACK) packet to inform a transmitting end that the mobile host is recovered;
   a first packet transceiver which transmits/receives the generated ACK packet and a data packet,
   wherein the path recovery notification manager generates the ACK packet including a TCP header, which contains a path recovery option field indicating a state of a disconnected path and a selective acknowledgement (SACK) option field that is set when a packet is partially lost, and
   wherein the path recovery option field comprises:
   a path recovery notification field which informs that the disconnected path is completely recovered;
   a partial packet loss notification field which informs that the packet is partially lost; and
   a no-packet-arrival field which informs that no packet is arrived.

2. The apparatus of claim 1, wherein the SACK field indicates a sequence number of lost packets and includes one or more SACK blocks.

3. The apparatus of claim 1, wherein the path recovery notification manager further comprises:
   a timer setting unit which sets a timer for an round trip time(RTT)/2 immediately after the ACK packet is transmitted;
   a timer manager which checks expiration of the timer so that, if the timer is expired, then a no-packet-arrival flag is set in the ACK packet, if the timer is not expired and a new packet is received, then the timer is canceled, and a partial packet loss flag is set in the ACK packet while generating the SACK blocks to be set in the ACK packet, and if the timer is not expired and the new packet is not received, then the procedure waits until the timer is expired.

4. The apparatus of claim 1, further comprising:
   a second packet transceiver which transmits/receives the data packet and the ACK packet through the first packet transceiver and a wireless base station; and
   a path recovery notification processor which handles a process when the path recovery option field is contained in the received ACK packet.

5. The apparatus of claim 4, wherein the path recovery notification processor comprises:
   a first checking unit which checks whether a newly received ACK packet is recovered from packet loss if a loss recovery flag is set which indicates whether loss recovery is being processed;
   an output unit which releases the loss recovery flag if the checking result shows that the packet loss is recovered, determines whether a congestion window is sufficiently sized to transmit a new packet if a non-recovered duplicate ACK packet is received, and transmits the new packet to a receiving end if the determination result shows that the new packet can be transmitted;
   a second checking unit which checks whether a path recovery option number is contained in the received ACK packet if the loss recovery flag is not set, and checks whether a retransmission timer is expired if the path recovery option number is contained in the received ACK packet;
   a third checking unit which restores the congestion window and a slow start threshold to a value used before the retransmission timer is expired if the retransmission timer is expired, and checks whether the partial packet loss flag is set if the retransmission timer is not expired;
   a comparator which sets the loss recovery flag and transmits only lost packets by analyzing the SACK blocks and then extracts lost packet numbers if the partial packet loss flag is set, and compares whether a difference between a last packet transmission time and a current time is equal to or greater than the RTT if the partial packet loss flag is not set; and
   a fourth checking unit which sets the loss recovery flag and retransmits all packets transmitted after a last ACK packet is received if the comparison result shows that the difference is equal to or greater than the RTT, and performs a slow start algorithm in the case that the no-packet-arrival flag is set in the path recovery option field if the comparison result shows that the difference is less than the RTT.

6. A method of improving transmission control protocol (TCP) performance using path recovery notification over a wireless network, the method comprising:

recognizing recovery of a wireless section from disconnection;

encapsulating information on recovery into an acknowledgement (ACK) packet and transmitting the information to a transmitting end;

setting a timer to round trip time(RTT)/2;

canceling the operation of the timer and transmitting the ACK packet, in which a partial packet loss flag is set and a selective acknowledgement (SACK) option field is added, to a transmitting end if a data packet is received before the timer is expired; and setting a no-packet-arrival flag in the ACK packet and then transmitting the ACK packet to the transmitting end if the timer is expired.

7. The method of claim 6, wherein, in the encapsulating and transmitting, the ACK packet is generated including a TCP header which contains a path recovery option field indicating a state of a disconnected path and a selective acknowledgement (SACK) option field that is set when a packet is partially lost.

8. The method of claim 7, wherein the path recovery option field comprises:

a path recovery notification field which informs that the disconnected path is completely recovered;

a partial packet loss notification field which informs that the packet is partially lost; and a no-packet-arrival field which informs that no packet is arrived.

9. A method of improving transmission control protocol (TCP) performance using path recovery notification over a wireless network, the method comprising:

checking whether a newly received acknowledgement (ACK) packet is recovered from packet loss if a loss recovery flag is set which indicates whether loss recovery is being processed;

releasing the loss recovery flag if the checking result shows that the packet loss is recovered, determining whether a congestion window is sufficiently sized to transmit a new packet if a non-recovered duplicate ACK packet is received, and transmitting the new packet to a receiving end if the determination result shows that the new packet can be transmitted;

checking whether a path recovery option number is contained in the received ACK packet if the loss recovery flag is not set, and checking whether a retransmission timer is expired if the path recovery option number is contained in the received ACK packet;

restoring the congestion window and a slow start threshold to a value used before the retransmission timer is expired if the retransmission timer is expired, and checking whether the partial packet loss flag is set if the retransmission timer is not expired;

setting the loss recovery flag and transmitting only lost packets by analyzing selective acknowledgement (SACK) blocks and then extracting lost packet numbers if the partial packet loss flag is set, and comparing whether a difference between a last packet transmission time and a current time is equal to or greater than the round trip time (RTT) if the partial packet loss flag is not set; and setting the loss recovery flag and retransmitting all packets transmitted after a last ACK packet is received if the comparison result shows that the difference is equal to or greater than the RTT, and performing a slow start algorithm in the case that the no-packet-arrival flag is set in the path recovery option field if the comparison result shows that the difference is less than the RTT.

\* \* \* \* \*